United States Patent
Griffith et al.

(10) Patent No.: US 9,483,107 B2
(45) Date of Patent: Nov. 1, 2016

(54) ADAPTIVE IDLE TIMEOUT FOR STORAGE DEVICES

(71) Applicant: Microsoft Technology Licensing, LLC, Redmond, WA (US)

(72) Inventors: Tristan Charles Griffith, Seattle, WA (US); James C. Bovee, Redmond, WA (US); Bruce J. Sherwin, Jr., Woodinville, WA (US); Tobias Marius Klima, Kirkland, WA (US); Philipp Ruilin Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 14/513,099

(22) Filed: Oct. 13, 2014

(65) Prior Publication Data

US 2016/0103481 A1    Apr. 14, 2016

(51) Int. Cl.
| | |
|---|---|
| *G06F 1/00* | (2006.01) |
| *G11B 15/46* | (2006.01) |
| *G06F 1/32* | (2006.01) |
| *G06F 3/06* | (2006.01) |

(52) U.S. Cl.
CPC ............. *G06F 1/3296* (2013.01); *G06F 1/324* (2013.01); *G06F 3/068* (2013.01); *G06F 3/0616* (2013.01); *G06F 3/0625* (2013.01); *G06F 3/0634* (2013.01); *G06F 3/0676* (2013.01)

(58) Field of Classification Search
CPC ..................................................... G06F 1/3203
USPC ......................................................... 713/323
See application file for complete search history.

(56) References Cited

U.S. PATENT DOCUMENTS

| | | | |
|---|---|---|---|
| 5,493,670 A | 2/1996 | Douglis et al. | |
| 5,633,767 A | 5/1997 | Boutaghou et al. | |
| 7,106,540 B1 * | 9/2006 | Hobbet et al. | 360/73.03 |

(Continued)

FOREIGN PATENT DOCUMENTS

| | | |
|---|---|---|
| JP | 2004110922 A | 4/2004 |
| JP | 2007279952 A | 10/2007 |

OTHER PUBLICATIONS

"International Search Report & Written Opinion Issued in PCT Application No. PCT/US2015105049", Mailed Date Jan. 14, 2016, 11 Pages.

(Continued)

*Primary Examiner* — Suresh Suryawanshi
(74) *Attorney, Agent, or Firm* — Sunah Lee; Dan Choi; Micky Minhas

(57) ABSTRACT

In embodiments of adaptive idle timeout for storage devices, a computing device includes a storage device that stores data for read and write access on a rotating media. An operating system of the computing device maintains a device cycle number as an accounting of each time the storage device is powered on-off. The computing device implements a storage device driver that is implemented to obtain the device cycle number of the storage device from the operating system, and determine a projected cycle number over a duration of operational time of the storage device based on the device cycle number. The storage device driver can then determine whether the projected cycle number exceeds a maximum of power on-off cycles within a warranty period of the storage device, and control a frequency of the storage device being powered-off if the projected cycle number exceeds the maximum of power on-off cycles.

20 Claims, 5 Drawing Sheets

(56) References Cited

U.S. PATENT DOCUMENTS

| | | |
|---|---|---|
| 8,122,294 B2 * | 2/2012 | Childs et al. .................... 714/42 |
| 8,356,139 B2 | 1/2013 | Ouchi |
| 9,229,796 B1 * | 1/2016 | Ma et al. |
| 2013/0234697 A1 * | 9/2013 | Carullo et al. ............. 324/76.11 |
| 2013/0283066 A1 * | 10/2013 | Weng et al. .................. 713/300 |

OTHER PUBLICATIONS

"Communicating With Your SSD: Understanding SMART Attributes", In Proceedings: Samsung SSD White Paper, Sep. 26, 2013, 2 Pages.

"Reducing Storage Energy Consumption by up to 75%", In Proceedings: Seagate White Paper, Dec. 22, 2012, 13 pages.

"Start/Stop Cycles", Retrieved From: <http://www.pcguide.com/ref/hdd/perf/qual/specCycles-c.html> Aug. 12, 2014, Sep. 2, 2000, 2 Pages.

Bisson, et al., "A Hybrid Disk-Aware Spin-Down Algorithm with I/O Subsystem Support", In Proceedings: IEEE International Performance, Computing, and Communications Conference, Apr. 11, 2007, 10 Pages.

Buzbee, et al., "Power-Saving Approaches and Tradeoffs for Storage Systems", Available at: <https://www.cs.fsu.edu/research/reports/TR-130627.pdf>, 2013, 29 Pages.

Second Written Opinion, Application No. PCT/US2015/055049, Jul. 6, 2016, 7 pages.

* cited by examiner

ADAPTIVE IDLE TIMEOUT FOR STORAGE DEVICES

BACKGROUND

Storage devices, and specifically rotating media, such as Hard Disk Drives (HDD) and Solid-State Hybrid Drives (SSHD), have a finite lifetime and contain moving parts that wear out over time. A storage device can be put into a low-power state, in which case the moving parts are typically stopped or placed in a standby position. When the storage device is powered back up from the low-power state, such as when an input-output request is initiated, the moving parts are positioned back to active states. The movement of the storage device parts between the low-power and active states wears on the parts, and after a large number of power transition cycles (referred to as a load-unload cycle), the moving parts can fail. Generally, a load-unload cycle describes the movement of a read-write head assembly from its standby position over the rotating platter in a storage device, to an active state when initiated for an input-output request, and back into the standby position. Further, a power cycle of a computing device that includes a storage device with a rotating media causes a load-unload cycle of the storage device. Most of the storage devices have a limited number of load-unload cycles that they can withstand until the moving parts are damaged or worn, which is a data integrity risk and can lead to overall data loss.

Typically, an operating system of a computing device that includes a storage device with rotating media can employ a static timeout, which is a simple mechanism to power-down the storage device when it becomes idle. The static timer is reset and begins counting each time that an input-output request is issued, and when the static timer reaches a pre-defined time threshold, the operating system actively spins-down the rotating platter in the storage device to its standby position. This technique can be used to conserve power, such as battery power in a mobile computing device that includes a storage device with a rotating media. However, the frequent load-unload cycles of the storage device initiated by the host computing device system can excessively wear the storage device, which may then fail earlier than the device manufacturer advertises or guarantees for the device.

Similarly, a storage device itself may be implemented with a firmware timer and logic that determines how long the device has operated without receiving an input-output request. If the time threshold is exceeded, the speed of the rotating platter of the storage device may be reduced, or halted completely. However, firmware timers are generally designed to maintain device functionality and longevity, which may be at the expense of power savings in a mobile computing device that relies on battery power for operation.

SUMMARY

This Summary introduces features and concepts of adaptive idle timeout for storage devices, which is further described below in the Detailed Description and/or shown in the Figures. This Summary should not be considered to describe essential features of the claimed subject matter, nor used to determine or limit the scope of the claimed subject matter.

Adaptive idle timeout for storage devices is described. In embodiments, a computing device includes a storage device that stores data on a rotating media, such as may be accessed to read and write the data. An operating system of the computing device maintains a device cycle number as an accounting of each time the storage device is powered on-off. The computing device implements a storage device driver that is implemented to obtain the device cycle number of the storage device from the operating system, and determine a projected cycle number over a duration of operational time of the storage device based on the device cycle number. The storage device driver can then determine whether the projected cycle number exceeds a maximum of power on-off cycles within a warranty period of the storage device, and control a frequency of the storage device being powered-off if the projected cycle number exceeds the maximum of power on-off cycles.

In embodiments, the storage device driver can control the frequency of the storage device being powered-off based on an adjustment of an adaptive idle timeout of the storage device. The storage device driver can adjust the adaptive idle timeout, which indicates an idle time duration of the storage device. For example, the storage device driver can increase the adaptive idle timeout to decrease the frequency of the storage device being powered-off. Alternatively, the storage device driver can decrease the adaptive idle timeout to increase the frequency of the storage device being powered-off if the projected cycle number does not exceed the maximum of power on-off cycles. Alternatively, the storage device driver can maintain (e.g., not adjust) the adaptive idle timeout to maintain the frequency of the storage device being powered-off if the projected cycle number does not exceed the maximum of power on-off cycles.

BRIEF DESCRIPTION OF THE DRAWINGS

Embodiments of adaptive idle timeout for storage devices are described with reference to the following Figures. The same numbers may be used throughout to reference like features and components that are shown in the Figures.

DETAILED DESCRIPTION

Embodiments of adaptive idle timeout for storage devices are described and can be implemented to control how often a storage device in a computing device is powered on-off. For example, a computing device may include a Hard Disk Drive (HDD) or a Solid-State Hybrid Drive (SSHD), which typically will have a finite lifetime due to moving parts that wear out over time, such as a read-write head assembly of the rotating media. An operating system and storage device driver in the computing device can be implemented to control the number of load-unload cycles of the storage device, keeping the power cycles at a level that does not exceed (or is not likely to exceed) a maximum of power cycles within a warranty period of the storage device, thus putting stored data at risk of being corrupted and/or lost.

The operating system can track the number of power cycles that the storage device experiences, and the storage device driver can determine a projected cycle number over a duration of operational time of the storage device. The storage device driver can then determine whether the projected cycle number exceeds a maximum of power on-off cycles within a warranty period of the storage device. An idle timeout of the storage device can be increased if the storage device is being power-cycled at a rate that may negatively impact its longevity. By increasing the idle timeout, the operating system and storage device driver effectively reduce the frequency of power cycles that the storage device experiences. After some time, the effective power-cycle frequency may be low enough that longevity of the storage device is no longer in question, and the idle timeout of the storage device can be decreased to optimize for power consumption in the computing device.

While features and concepts of adaptive idle timeout for storage devices can be implemented in any number of different devices, systems, networks, environments, and/or configurations, embodiments of adaptive idle timeout for storage devices are described in the context of the following example devices, systems, and methods.

Figure 1:
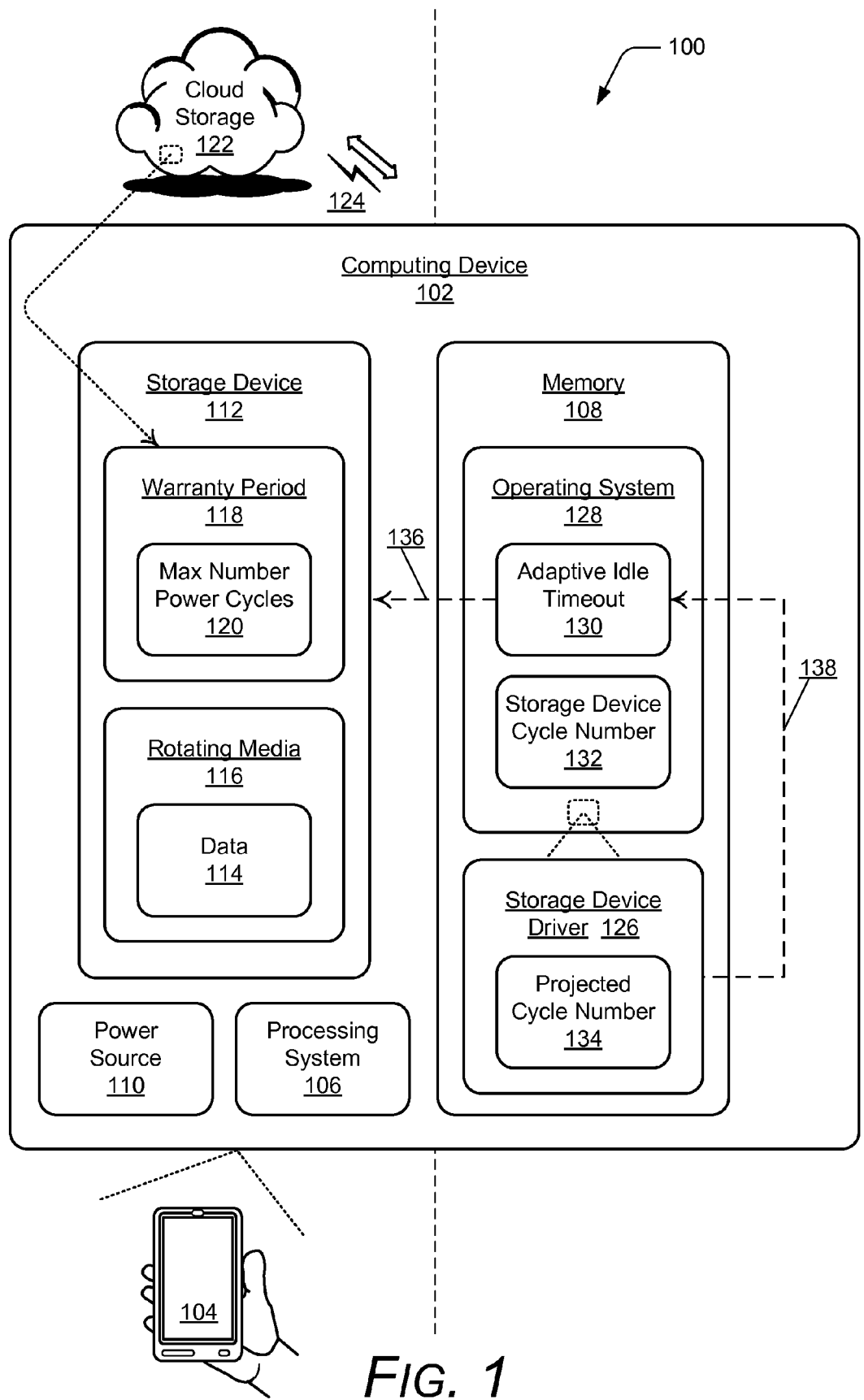
FIG. 1 illustrates an example system with an example computing device in which embodiments of adaptive idle timeout for storage devices can be implemented.

FIG. 1 illustrates an example system 100 in which embodiments of adaptive idle timeout for storage devices can be implemented. The system 100 includes an example computing device 102 that may be any one or combination of a wired or wireless device, such as a mobile phone 104, tablet computer, or any other computing, communication, entertainment, gaming, media playback, desktop computer, and/or other type of electronic device implemented as a computing device. The computing device 102 can be implemented with various components, such as a processing system 106 and memory 108, a power source 110 (e.g., a battery) to power device components, and with any number and combination of different components as further described with reference to the example device shown in FIG. 5.

In this example system 100, the computing device 102 includes a storage device 112 that is implemented to store data 114 on a rotating media 116 that is accessed to read and write the data. In implementations of the computing device 102, the storage device 112 may be implemented as the memory 108 and/or the storage device 112 includes the memory 108. Alternatively, the computing device may include both the memory 108 and the storage device 112, as shown and described with reference to FIG. 1. The storage device 112 may be configured as a Hard Disk Drive (HDD) or as a Solid-State Hybrid Drive (SSHD), which typically will have a finite lifetime due to moving parts that wear out over time, such as a read-write head assembly of the rotating media 116.

The storage device 112 can be put into a low-power state, in which case the moving parts of the device are stopped or moved to a standby position. When the storage device 112 is powered back up from the low power state, the moving parts are positioned back to active states. The movement of the storage device parts between the low-power and active states wears on the parts, and after a large number of cycles, the moving parts can fail. Generally, a load-unload cycle describes the movement of a read-write head assembly from its standby position over the rotating media 116 in the storage device 112 and back into its standby position. Further, a power cycle of the computing device 102 causes a load-unload cycle of the rotating media 116 in the storage device 112.

The storage device 112 may be warranted by a manufacturer of the device and have a warranty period 118, typically for a set number of years and/or based on a maximum number of power cycles 120 in which the rotating media 116 is stopped or place in a standby position, and the storage device is turned off or otherwise powered down. In this example system 100, the warranty period 118 and/or the maximum number of power cycles 120 may be stored as part of the device data 114 on the device itself. Alternatively, the computing device 102 may acquire or otherwise determine the warranty period 118 and/or the maximum number of power cycles 120 from a cloud storage 122 via a network 124. The cloud storage 122 can be utilized for any type of network-based stored data (also referred to as cloud-based, or "in the cloud").

Any of the devices described herein can communicate via the network 124, such as for data communication between the computing device 102 and the cloud storage 122, and the network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The computing device 102 includes a storage device driver 126 that can be implemented as a software application or module, such as executable software instructions (e.g., computer-executable instructions) that are executable with the processing system 106 of the computing device to implement embodiments of adaptive idle timeout for storage devices. The storage device driver 125 can be stored on computer-readable storage memory (e.g., the memory 108 or the storage device 112), such as any suitable memory device or electronic data storage implemented by the computing device. In implementations, the storage device driver 126 can be implemented as a component of the device operating system 128, which includes an adaptive idle timeout 130 to control initiating a low-power state of the storage device 112. Additionally, the storage device driver 126, when implemented as a component of the operating system 128, includes and/or manages the adaptive idle timeout 130 as well as a storage device cycle number 132 and a projected cycle number 134 as further described below.

In embodiments, the operating system 128 keeps track of, and maintains, a storage device cycle number 132 as an accounting of each time the storage device 112 is powered on-off. The device cycle number 132 is the current number of load-unload cycles of the storage device 112 since the storage device was first recognized as a component of the computing device 102 by the operating system 128. The storage device driver 126 is implemented to request and/or obtain the storage device cycle number 132 from the operating system 128 and determine a projected cycle number 134 based on the device cycle number. The projected cycle number 134 is determined over the operational time duration of the storage device 112. The storage device driver 126 can determine whether the projected cycle number 134 exceeds (or is likely to exceed) the maximum number of power on-off cycles 120 within the warranty period 118 of the storage device 112, and then control the frequency of the storage device being powered-off if the projected cycle number 134 exceeds the maximum number of power on-off cycles.

The storage device driver 126 is implemented to control the frequency of the storage device 112 being powered-off (at 136) based on an adjustment 138 of the adaptive idle timeout 130 that indicates the idle time duration of the storage device. For example, the storage device driver 126 can increase the adaptive idle timeout 130 to decrease the frequency of the storage device 112 being powered-off if the projected cycle number 134 exceeds the maximum number of power on-off cycles 120 in the warranty period 118. Alternatively, the storage device driver 126 can decrease the adaptive idle timeout 130 to increase the frequency of the storage device being 112 powered-off if the projected cycle number 134 does not exceed the maximum number of power on-off cycles 120 in the warranty period 118. Optionally, the storage device driver 126 may maintain the frequency of the storage device 112 being powered-off if the projected cycle number 134 does not exceed the maximum number of power on-off cycles 120 by maintaining the current setting of the adaptive idle timeout 130.

In implementations, the maximum number of power cycles 120 of the storage device 112 can be determined as the warranty period of the device (e.g., three years or any other duration of time) divided by the maximum number of load-unload cycles that the storage device 112 can experience before failing. When the storage device is idle, the storage device driver 126 can compare the number of load-unload cycles (e.g., the storage device cycle number 132) that the storage device 112 has experienced against the theoretical worst case load-unload cycle count (e.g., the maximum number of power cycles 120) given the minimum load/unload period. Typically, the storage device 112 is not powered-down when a user is interacting with the computing device 102, or when there is "maintenance" activity (e.g., system processing) occurring on either the computing device 102 or the storage device. The storage device 112 can be powered-down when the system is coalescing I/O (input/output) such that there is a high likelihood that no will be sent to the storage device 112 for a period longer than the minimum load/unload period.

If the number of load-unload cycles of the storage device 112 (e.g., the storage device cycle number 132) is less than the worst case (e.g., the maximum number of power cycles 120), then the operating system 128 can transition the storage device 112 to a low-power state when the device is idle. Otherwise, the operating system 128 will keep the storage device 112 powered-up for at least the minimum load-unload cycle period, as controlled by the storage device driver 126 adjustments of the adaptive idle timeout 130. This prevents the storage device 112 from exceeding the maximum load-unload cycle frequency (e.g., the maximum number of power cycles 120) and potentially failing before the warranty period 118 expires.

However, if the storage device 112 experiences a high frequency of load-unload cycles, then it may reach the worst case number of load-unload cycles (e.g., the maximum number of power cycles 120) before the warranty period 118 expires. When the projected cycle number 134 exceeds (or is likely to exceed) the maximum number of power cycles 120, the operating system 128 can keep the storage device 112 powered-up until the projected cycle number 134 becomes less than the worst case (e.g., the maximum number of power cycles 120) of load-unload cycles.

The longer that the storage device 112 remains in a particular power state (either powered-up and active, or powered-down and idle) then the larger the difference between the projected cycle number 134 and the worst case load-unload cycle count, which means that the storage device 112 can be powered-down when system conditions of the computing device 102 accommodate the storage device being powered-down. When the storage device is idle, the operating system 128 can power-down the device when the computing device 102 is in such a state that it's highly unlikely the storage device 112 will become active within the minimum load-unload period, as designated by the adaptive idle timeout 130.

Figure 2:
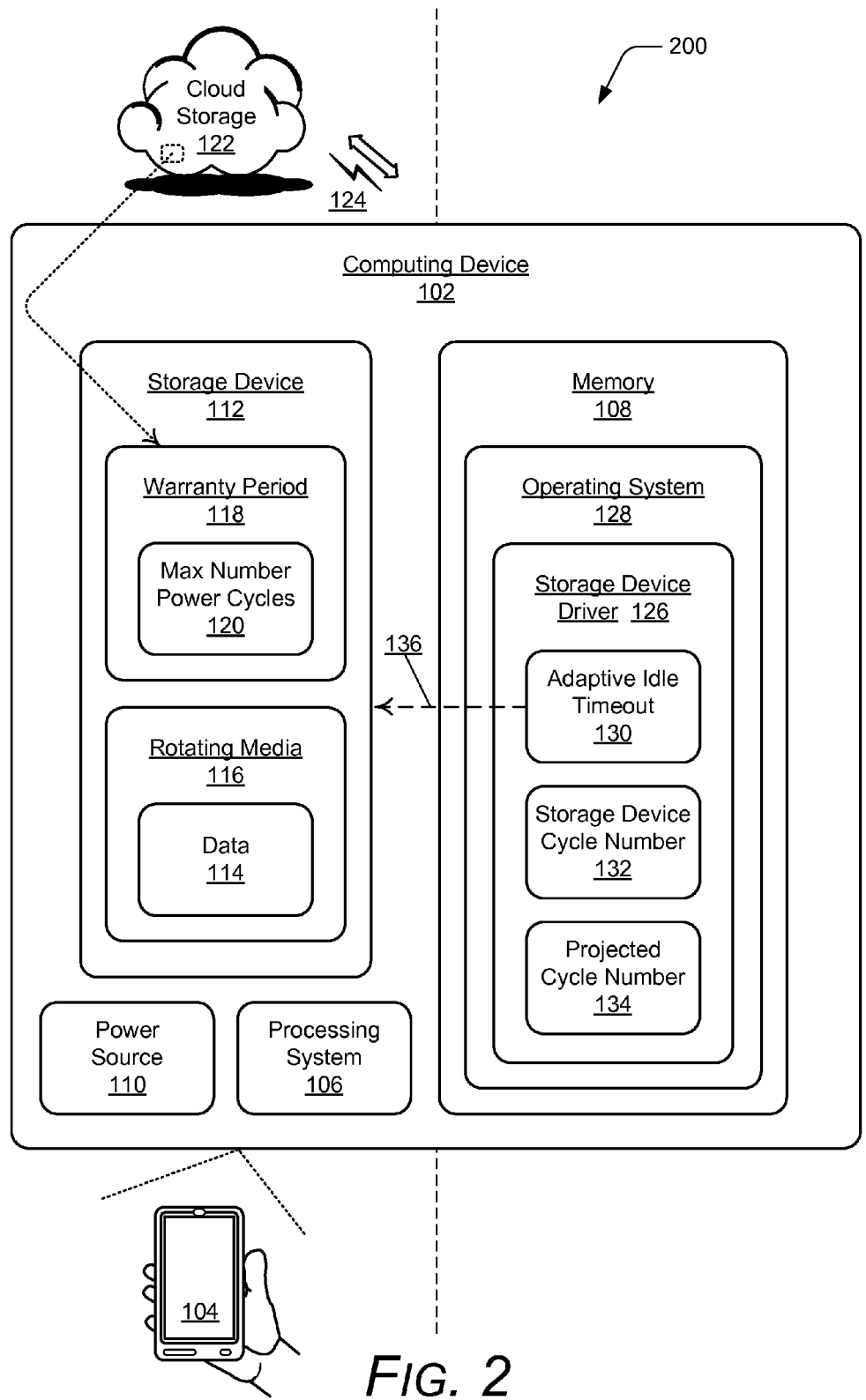
FIG. 2 illustrates another example system with the example computing device shown in FIG. 1, and in which embodiments of adaptive idle timeout for storage devices can be implemented.

FIG. 2 illustrates another example system 200 with the example computing device 102 that is shown and described with reference to FIG. 1, and in which embodiments of adaptive idle timeout for storage devices can be implemented. The system 200 depicts an alternate implementation of the storage device driver 126 and the operating system 128, as implemented in the computing device 102. In this example, the storage device driver 126 is shown implemented as a component or module of the device operating system 128, and the storage device driver 126 includes and/or manages the adaptive idle timeout 130 to control initiating a low-power state of the storage device 112. In this implementation, the storage device driver 126 also maintains the storage device cycle number 132 and determines the projected cycle number 134.

As described with reference to FIG. 1, the storage device driver 126 keeps track of, and maintains, the storage device cycle number 132 as an accounting of each time the storage device 112 is powered on-off. The device cycle number 132 is the current number of load-unload cycles of the storage device 112 since the storage device was first recognized as a component of the computing device 102 by the operating system 128. The storage device driver 126 is also implemented to determine a projected cycle number 134 based on the device cycle number. The projected cycle number 134 is determined over the operational time duration of the storage device 112. The storage device driver 126 can then determine whether the projected cycle number 134 exceeds (or is likely to exceed) the maximum number of power on-off cycles 120 within the warranty period 118 of the storage device 112, and control the frequency of the storage device being powered-off if the projected cycle number 134 exceeds the maximum number of power on-off cycles.

The storage device driver 126 is implemented to control the frequency of the storage device 112 being powered-off (at 136) based on the adjustment 138 of the adaptive idle timeout 130 that indicates the idle time duration of the storage device. For example, the storage device driver 126 can increase the adaptive idle timeout 130 to decrease the frequency of the storage device 112 being powered-off if the projected cycle number 134 exceeds the maximum number of power on-off cycles 120 in the warranty period 118. Alternatively, the storage device driver 126 can decrease the adaptive idle timeout 130 to increase the frequency of the storage device being 112 powered-off if the projected cycle number 134 does not exceed the maximum number of power on-off cycles 120 in the warranty period 118. Optionally, the storage device driver 126 may maintain the frequency of the storage device 112 being powered-off if the projected cycle number 134 does not exceed the maximum number of power on-off cycles 120 by maintaining the current setting of the adaptive idle timeout 130.

Example methods 300 and 400 are described with reference to respective FIGS. 3 and 4 in accordance with one or more embodiments of adaptive idle timeout for storage devices. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific integrated Circuits (ASICs), Application-specific Standard Products (ASSPs), System-on-a-chip systems (SoCs), Complex Programmable Logic Devices (CPLDs), and the like.

Figure 3:
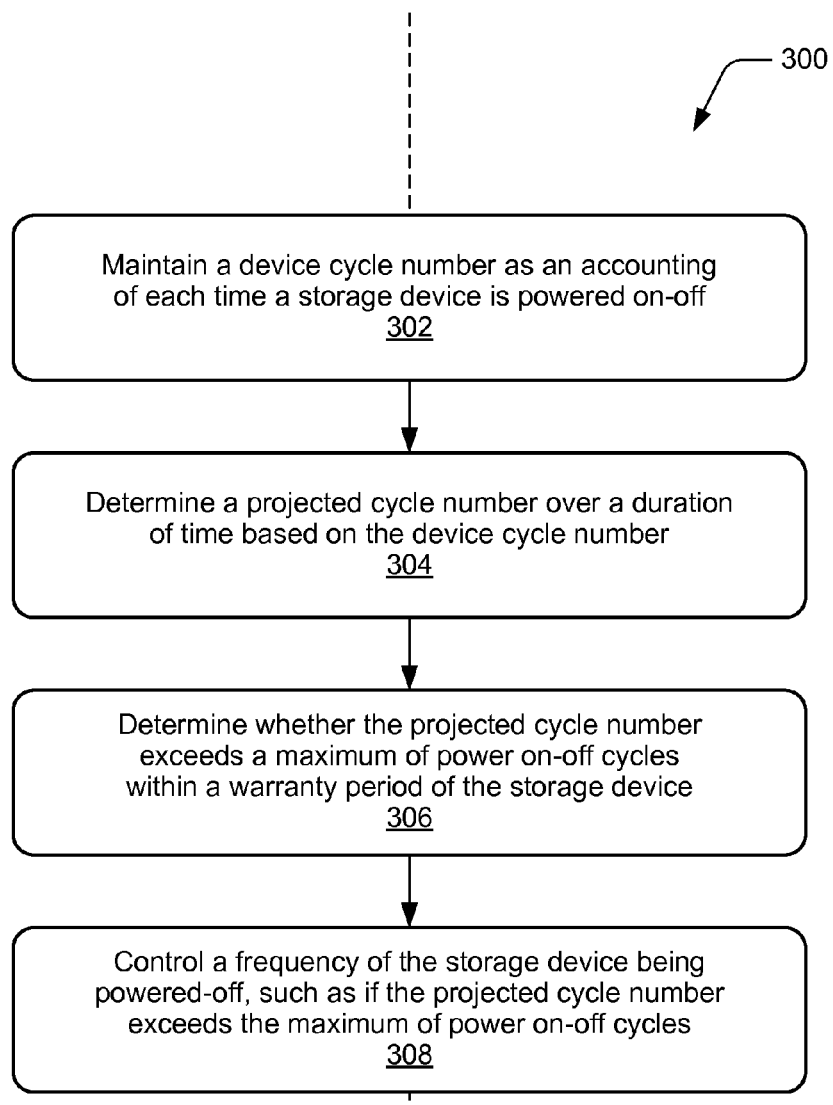
FIG. 3 illustrates example method(s) of adaptive idle timeout for storage devices in accordance with one or more embodiments.

FIG. 3 illustrates example method(s) 300 of adaptive idle timeout for storage devices, and is generally described with reference to the example systems shown in FIGS. 1 and 2. The order in which the method is described is not intended to be construed as a limitation, and any number or combination of the method operations can be performed in any order to implement a method, or an alternate method.

At 302, a device cycle number is maintained as an accounting of each time a storage device is powered on-off For example, the operating system 128 that is implemented in the computing device 102 maintains the storage device cycle number 132 as an accounting of each time the storage device 112 is powered on-off, where the storage device 112 includes the rotating media 116 that is accessed to read and write the data 114.

At 304, a projected cycle number over a duration of time is determined based on the device cycle number. For example, the storage device driver 126 that is implemented in the computing device 102 determines the projected cycle number 134 over a duration of time based on the storage device cycle number 132. The duration of time over which the projected cycle number 134 is determined is an operational time duration of the storage device 112, and the projected cycle number 134 is determined over the operational time duration of the storage device.

At 306, determine whether the projected cycle number exceeds a maximum of power on-off cycles within a warranty period of the storage device. For example, the storage device driver 126 that is implemented in the computing device 102 determines whether the projected cycle number 134 exceeds the maximum of power on-off cycles 120 within the warranty period 118 of the storage device 112.

At 308, a frequency of the storage device being powered-off is controlled, such as if the projected cycle number exceeds the maximum of power on-off cycles. For example, the storage device driver 126 that is implemented in the computing device 102 controls the frequency of the storage device 112 being powered-off based on an adjustment 138 of the adaptive idle timeout 130 of the storage device. Adjustments of the adaptive idle timeout 130 are further described with reference to the method shown in FIG. 4

Figure 4:
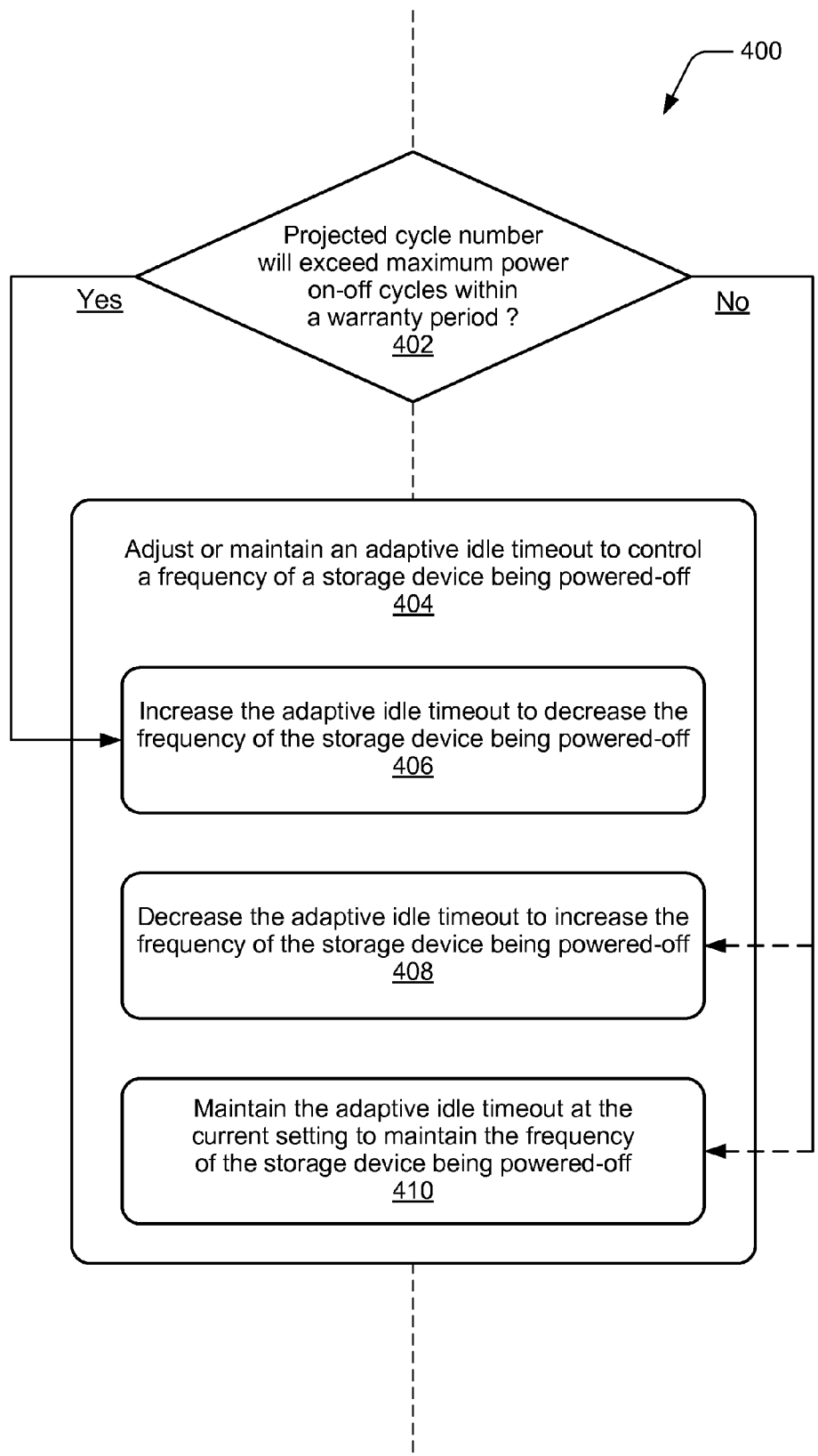
FIG. 4 illustrates example method(s) of adaptive idle timeout for storage devices in accordance with one or more embodiments.

FIG. 4 illustrates example method(s) 400 of adaptive idle timeout for storage devices, and is generally described with reference to the example systems shown in FIGS. 1 and 2. The order in which the method is described is not intended to be construed as a limitation, and any number or combination of the method operations can be performed in any order to implement a method, or an alternate method.

At 402, a determination is made as to whether a projected cycle number of a storage device being powered on-off will exceed a maximum of power on-off cycles within a warranty period of the storage device. For example, the storage device driver 126 that is implemented in the computing device 102 determines whether the projected cycle number 134 exceeds (or is likely to exceed) the maximum of power on-off cycles 120 within the warranty period 118 of the storage device 112.

At 404, an adaptive idle timeout is adjusted or maintained to control a frequency of a storage device being powered-off. For example, the adaptive idle timeout 130 indicates an idle time duration of the storage device 112, and the storage device driver 126 adjusts or maintains the adaptive idle timeout 130 to control the frequency of the storage device 112 being powered-off (at 136). An adjustment 138 of the adaptive idle timeout 130 can include any of the alternatives described with reference to method operations 306-310.

If the projected cycle number of the storage device being powered on-off will exceed (or is likely to exceed) the maximum of power on-off cycles within the warranty period of the storage device (i.e., "Yes" from 402), then at 406, the adaptive idle timeout is increased, which is effective to decrease the frequency of the storage device being powered-off. For example, the storage device driver 126 increases the adaptive idle timeout 130, which is effective to decrease the frequency of the storage device 112 being powered-off by the operating system 128 if the projected cycle number 134 of the storage device 112 being powered on-off will exceed (or is likely to exceed) the maximum of power on-off cycles 120 within the warranty period 118 of the storage device.

If the projected cycle number of the storage device being powered on-off will not exceed (or is not likely to exceed) the maximum of power on-off cycles within the warranty period of the storage device (i.e., "No" from 402), then at 408, the adaptive idle timeout is decreased, which is effective to increase the frequency of the storage device being powered-off. For example, the storage device driver 126 decreases the adaptive idle timeout 130, which is effective to increase the frequency of the storage device 112 being powered-off by the operating system 128 if the projected cycle number 134 of the storage device 112 being powered on-off will not exceed (or is not likely to exceed) the maximum of power on-off cycles 120 within the warranty period 118 of the storage device. Alternatively at 410, the adaptive idle timeout is maintained at the current setting to maintain the frequency of the storage device being powered-off For example, the storage device driver 126 maintains the current setting of the adaptive idle timeout 130 to maintain the frequency of the storage device 112 being powered-off by the operating system 128 if the projected cycle number 134 does not exceed the maximum of power on-off cycles 120.

Figure 5:
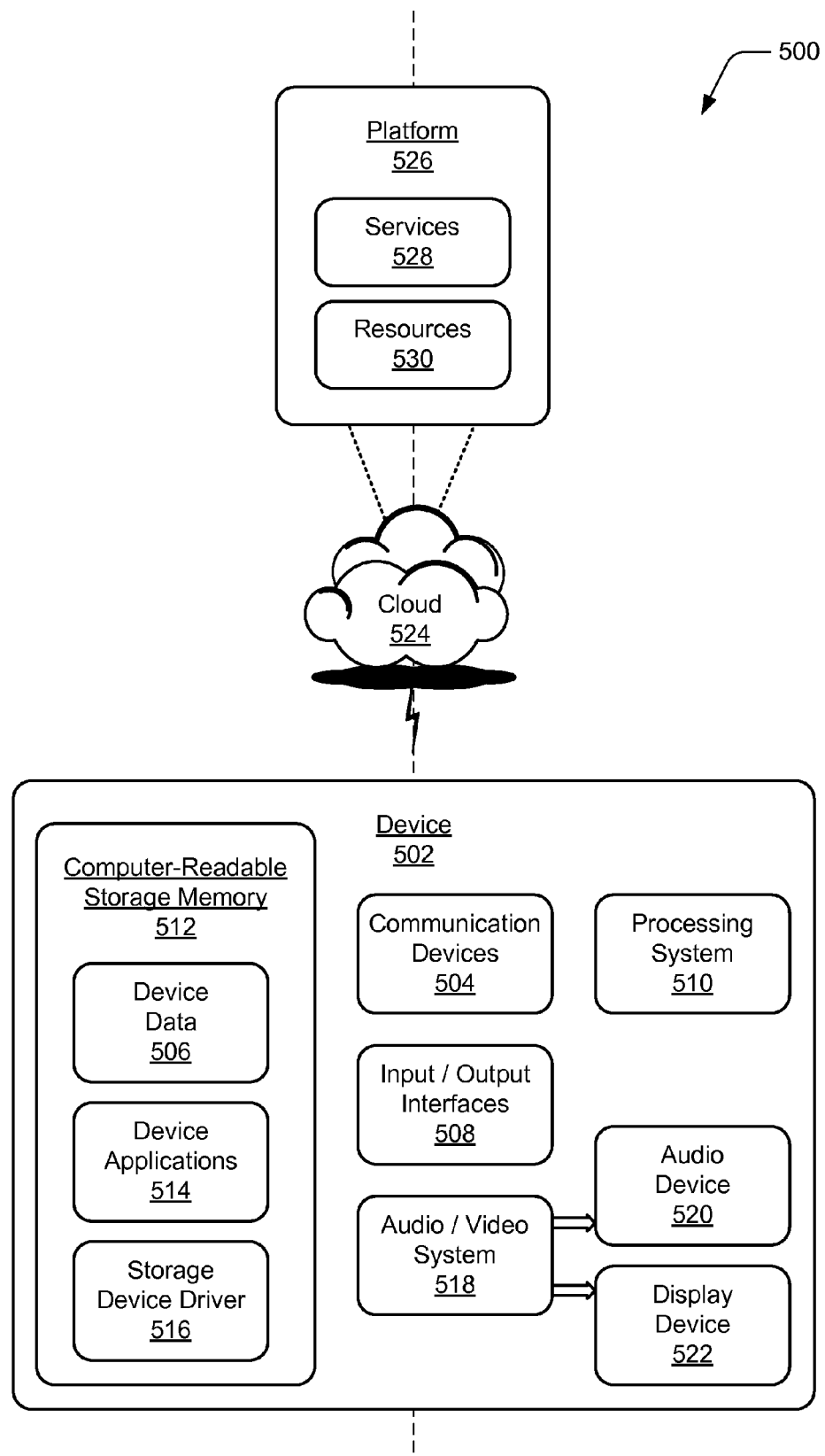
FIG. 5 illustrates an example system with an example device that can implement embodiments of adaptive idle timeout for storage devices.

FIG. 5 illustrates an example system 500 that includes an example device 502, which can implement embodiments of adaptive idle timeout for storage devices. The example device 502 can be implemented as any of the computing devices described with reference to the previous FIGS. 1-4 such as any type of client device, mobile phone, tablet, computing, communication, entertainment, gaming, media playback, and/or other type of device. For example, the computing device 102 shown in FIGS. 1 and 2 may be implemented as the example device 502.

The device 502 includes communication devices 504 that enable wired and/or wireless communication of device data 506, such as warranty data related to the rotating media of a storage device. Additionally, the device data can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 512, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 512 provides storage of the device data 506 and various device applications 514, such as an operating system that is maintained as a software application with the computer-readable storage memory and executed by the processing system 510. In this example, the device applications include a storage device driver 516 that implements embodiments of adaptive idle timeout for storage devices, such as when the example device 502 is implemented as the computing device 102 shown in FIGS. 1 and 2. An example of the storage device driver 516 is the storage device driver 126 that is implemented by the computing device 102, as described with reference to FIGS. 1 and 2.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In embodiments, at least part of the techniques described for adaptive timeout for storage devices may be implemented in a distributed system, such as over a "cloud" 524 in a platform 526. The cloud 524 includes and/or is representative of the platform 526 for services 528 and/or resources 530. The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via, the platform 526 that abstracts the functionality of the cloud 524.

Although embodiments of adaptive idle timeout for storage devices have been described in language specific to features and/or methods, the appended claims are not necessarily limited to the specific features or methods described. Rather, the specific features and methods are disclosed as example implementations of adaptive idle timeout for storage devices, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A method implemented in a computing device comprises maintaining a device cycle number as an accounting of each time a storage device is powered on-off, the storage device including a rotating media that is accessed to read and write data; determining a projected cycle number over a duration of time based on the device cycle number; determining whether the projected cycle number exceeds a maximum of power on-off cycles within a warranty period of the storage device; and controlling a frequency of the storage device being powered-off if the projected cycle number exceeds the maximum of power on-off cycles.

Alternatively or in addition to the above described method, any one or combination of: the duration of time is an operational time duration of the storage device, and said determining the projected cycle number over the operational time duration of the storage device; said controlling the frequency of the storage device being powered-off based on an adjustment of an adaptive idle timeout of the storage device; adjusting an adaptive idle timeout to control the frequency of the storage device being powered-off, the adaptive idle timeout indicating an idle time duration of the storage device; increasing the adaptive idle timeout to decrease the frequency of the storage device being powered-off; decreasing the adaptive idle timeout to increase the frequency of the storage device being powered-off if the projected cycle number does not exceed the maximum of power on-off cycles; maintaining the adaptive idle timeout to maintain the frequency of the storage device being powered-off if the projected cycle number does not exceed the maximum of power on-off cycles.

A computing device comprises a storage device configured to store data on a rotating media that is accessed to read and write the data; an operating system configured to maintain a device cycle number as an accounting of each time the storage device is powered on-off; a processing system to implement a storage device driver that is executable and configured to: determine a projected cycle number over a duration of time based on the device cycle number; determine whether the projected cycle number exceeds a maximum of power on-off cycles within a warranty period of the storage device; and control a frequency of the storage device being powered-off if the projected cycle number exceeds the maximum of power on-off cycles.

Alternatively or in addition to the above described computing device, any one or combination of: the storage device driver is configured to obtain the device cycle number from the operating system to said determine the projected cycle number; the duration of time is an operational time duration of the storage device, and the storage device driver is configured to said determine the projected cycle number over the operational time duration of the storage device; the storage device driver is configured to said control the frequency of the storage device being powered-off based on an adjustment of an adaptive idle timeout that indicates an idle time duration of the storage device; the storage device driver is configured to increase the adaptive idle timeout to decrease the frequency of the storage device being powered-off; the storage device driver is configured to decrease the adaptive idle timeout to increase the frequency of the storage device being powered-off if the projected cycle number does not exceed the maximum of power on-off cycles; the storage device driver is configured to maintain the adaptive idle timeout to maintain the frequency of the storage device being powered-off if the projected cycle number does not exceed the maximum of power on-off cycles.

A computer-readable storage memory comprises a storage device driver stored as instructions that are executable and, responsive to execution of the instructions by a computing device, the computing device performs operations comprising to: maintain a device cycle number as an accounting of each time a storage device is powered on-off, the storage device including a rotating media that stores data; determine a projected cycle number over a duration of time based on the device cycle number; determine whether the projected cycle number exceeds a maximum of power on-off cycles within a warranty period of the storage device; and control a frequency of the storage de ice being powered-off if the projected cycle number exceeds the maximum of power on-off cycles.

Alternatively or in addition to the above described computer-readable storage memory, any one or combination of: the duration of time is an operational time duration of the storage device, and the computing device performs the operations of the storage device driver comprising to said determine the projected cycle number over the operational time duration of the storage device; the computing device performs the operations of the storage device driver further comprising to said control the frequency of the storage device being powered-off based on an adjustment of an adaptive idle timeout that indicates an idle time duration of the storage device; the computing device performs the operations of the storage device driver further comprising to increase the adaptive idle timeout to decrease the frequency of the storage device being powered-off; the computing device performs the operations of the storage device driver further comprising to decrease the adaptive idle timeout to increase the frequency of the storage device being powered-off if the projected cycle number does not exceed the maximum of power on-off cycles; the computing device performs the operations of the storage device driver further comprising to maintain the adaptive idle timeout to maintain the frequency of the storage device being powered-off if the projected cycle number does not exceed the maximum of power on-off cycles.

The invention claimed is:

1. A method, comprising:
    maintaining a device cycle number as an accounting of each time a storage device is powered on-off, the storage device including a rotating media that is accessed to read and write data;
    determining a projected cycle number over a duration of time based on the device cycle number;
    determining whether the projected cycle number exceeds a maximum of power on-off cycles within a warranty period of the storage device; and
    controlling a frequency of the storage device being powered-off if the projected cycle number exceeds the maximum of power on-off cycles, said controlling the frequency of the storage device being powered-off based on an adjustment of an adaptive idle timeout of the storage device.

2. The method as recited in claim 1, wherein the duration of time is an operational time duration of the storage device, and said determining the projected cycle number over the operational time duration of the storage device.

3. The method as recited in claim 1, further comprising:
    adjusting the adaptive idle timeout to control the frequency of the storage device being powered-off, the adaptive idle timeout indicating an idle time duration of the storage device.

4. The method as recited in claim 3, further comprising:
    increasing the adaptive idle timeout to decrease the frequency of the storage device being powered-off.

5. The method as recited in claim 3, further comprising:
    decreasing the adaptive idle timeout to increase the frequency of the storage device being powered-off if the projected cycle number does not exceed the maximum of power on-off cycles.

6. The method as recited in claim 3, further comprising:
    maintaining the adaptive idle timeout to maintain the frequency of the storage device being powered-off if the projected cycle number does not exceed the maximum of power on-off cycles.

7. A computing device, comprising:
    a storage device configured to store data on a rotating media that is accessed to read and write the data;
    an operating system configured to maintain a device cycle number as an accounting of each time the storage device is powered on-off;
    a processing system to implement a storage device driver that is executable and configured to:
        determine a projected cycle number over a duration of time based on the device cycle number;
        determine whether the projected cycle number exceeds a maximum of power on-off cycles within a warranty period of the storage device; and
        control a frequency of the storage device being powered-off if the projected cycle number exceeds the maximum of power on-off cycles, said control the frequency of the storage device being powered-off based on an adjustment of an adaptive idle timeout that indicates an idle time duration of the storage device.

8. The computing device as recited in claim 7, wherein the storage device driver is configured to obtain the device cycle number from the operating system to said determine the projected cycle number.

9. The computing device as recited in claim 7, wherein:
the duration of time is an operational time duration of the storage device; and
the storage device driver is configured to said determine the projected cycle number over the operational time duration of the storage device.

10. The computing device as recited in claim 7, wherein the storage device driver is configured to increase the adaptive idle timeout to decrease the frequency of the storage device being powered-off.

11. The computing device as recited in claim 7, wherein the storage device driver is configured to decrease the adaptive idle timeout to increase the frequency of the storage device being powered-off if the projected cycle number does not exceed the maximum of power on-off cycles.

12. The computing device as recited in claim 7, wherein the storage device driver is configured to maintain the adaptive idle timeout to maintain the frequency of the storage device being powered-off if the projected cycle number does not exceed the maximum of power on-off cycles.

13. A computer-readable storage memory comprising a storage device driver stored as instructions that are executable and, responsive to execution of the instructions by a computing device, the computing device performs operations comprising to:
maintain a device cycle number as an accounting of each time a storage device is powered on-off, the storage device including a rotating media that stores data;
determine a projected cycle number over a duration of time based on the device cycle number;
determine whether the projected cycle number exceeds a maximum of power on-off cycles within a warranty period of the storage device; and
control a frequency of the storage device being powered-off if the projected cycle number exceeds the maximum of power on-off cycles, said control the frequency of the storage device being powered-off based on an adjustment of an adaptive idle timeout that indicates an idle time duration of the storage device.

14. The computer-readable storage memory as recited in claim 13, wherein:
the duration of time is an operational time duration of the storage device; and
the computing device performs the operations of the storage device driver comprising to said determine the projected cycle number over the operational time duration of the storage device.

15. The computer-readable storage memory as recited in claim 13, wherein the computing device performs the operations of the storage device driver further comprising to increase the adaptive idle timeout to decrease the frequency of the storage device being powered-off.

16. The computer-readable storage memory as recited in claim 13, wherein the computing device performs the operations of the storage device driver further comprising to decrease the adaptive idle timeout to increase the frequency of the storage device being powered-off if the projected cycle number does not exceed the maximum of power on-off cycles.

17. The computer-readable storage memory as recited in claim 13, wherein the computing device performs the operations of the storage device driver further comprising to maintain the adaptive idle timeout to maintain the frequency of the storage device being powered-off if the projected cycle number does not exceed the maximum of power on-off cycles.

18. The method as recited in claim 1, wherein the maximum of power on-off cycles of the storage device is determined as the warranty period.

19. The computing device as recited in claim 7, wherein the storage device driver is configured to said determine whether the projected cycle number exceeds the maximum of power on-off cycles within the warranty period of the storage device while the storage device is idle.

20. The computer-readable storage memory as recited in claim 13, wherein the computing device performs the operations of the storage device driver comprising to said determine whether the projected cycle number exceeds the maximum of power on-off cycles within the warranty period of the storage device while the storage device is idle.

* * * * *